July 6, 1948.  S. W. BRIGGS ET AL  2,444,628
INTERNAL-COMBUSTION ENGINE
Filed Dec. 28, 1944  4 Sheets-Sheet 1
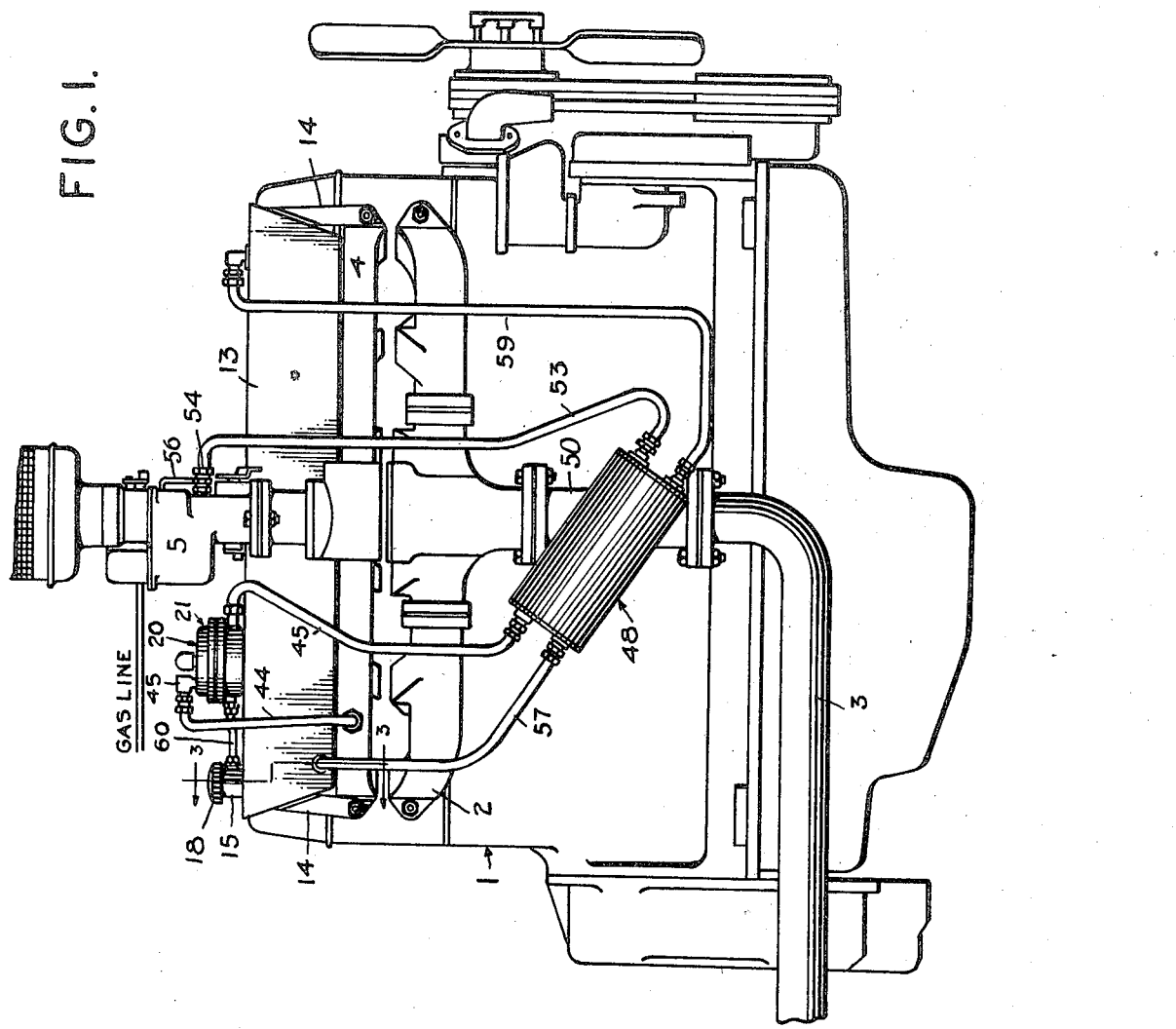
Inventors
Southwick W. Briggs
and Roscoe C. Porter
By Semmes, Keegin Beale & Semmes
Attorneys

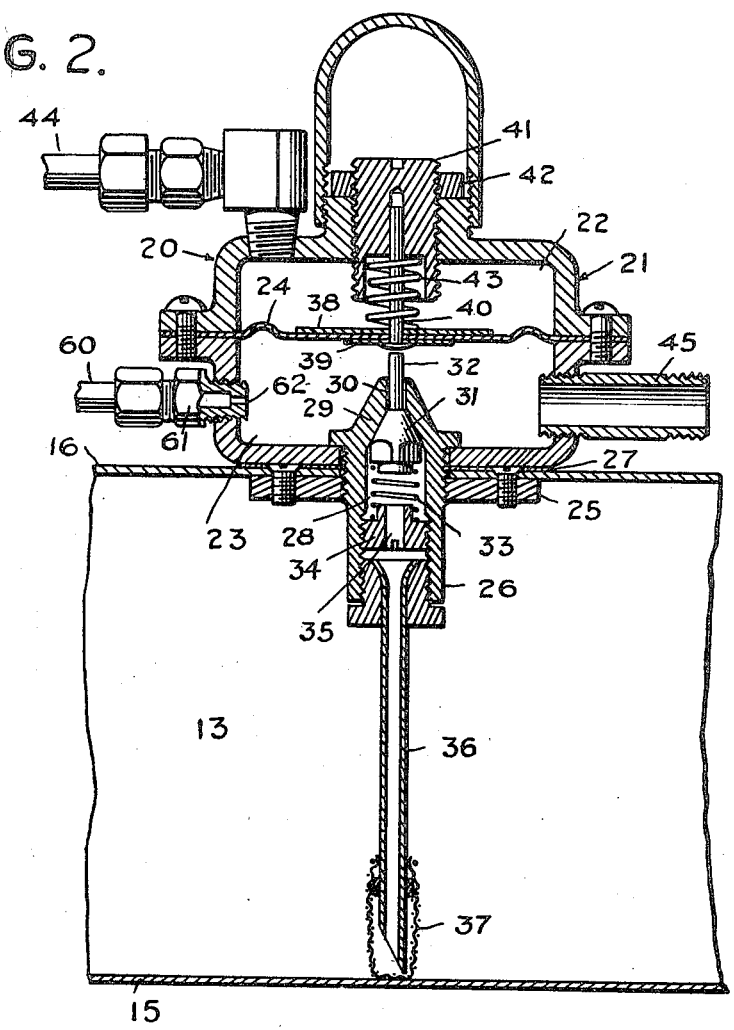
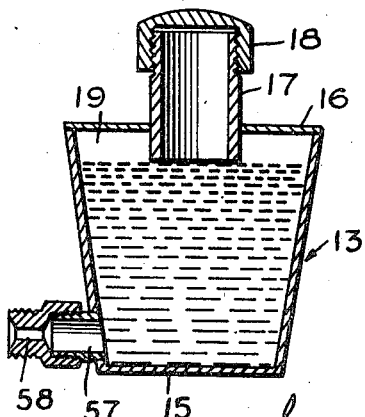

July 6, 1948.　　　S. W. BRIGGS ET AL　　　2,444,628
INTERNAL-COMBUSTION ENGINE
Filed Dec. 28, 1944　　　　　　　　　　　　　　4 Sheets-Sheet 3

Inventors
SOUTHWICK W. BRIGGS
and ROSCOE C. PORTER.
By Semmes, Keegin, Beale & Semmes
Attorneys Patented July 6, 1948

2,444,628

UNITED STATES PATENT OFFICE 2,444,628

INTERNAL-COMBUSTION ENGINE

Southwick W. Briggs, Washington, D. C., and Roscoe C. Porter, Arlington, Va., assignors, by direct and mesne assignments, to The Briggs Filtration Company, Bethesda, Md., a corporation of Maryland Application December 28, 1944, Serial No. 570,164

14 Claims. (Cl. 123—25)

The present invention relates to the formation and introduction of aqueous fluid into the cylinders of internal combustion engines and more particularly to apparatus for effecting and controlling the flow of such fluid.

The beneficial results from the addition of water to the cylinder charge in internal combustion engines have long been known. Not only does it suppress detonation and provide additional cooling to highly stressed parts of the engine but it also reduces carbon formation, plug fouling and oil sludging. It has likewise been found that the addition of moisture to the cylinder charge increases the horsepower of the engine and thereby permits the use of a lower octane fuel in engines designed for higher octane fuels.

Water has been introduced into the cylinders of internal combustion engines with the fuel mixture both as a liquid and as vapor or steam in various ways and at various points in the induction system of the engine, the usual method being to withdraw water from a supply tank thereof through a heat exchanger or steam generator and into the air induction system of the engine by the carburetor suction effect. This invention contemplates introducing steam into the air induction system of an internal combustion engine together with the fuel charge, and by steam, as used herein, is meant heated aqueous fluid, either as a heated vapor or a mixture of the vapor and hot water.

We have found it highly desirable to introduce steam into the airstream closely adjacent the point of introduction thereto of the liquid fuel, as its heat materially assists in vaporizing the fuel. We have noted, however, that if a flow of water for steam generation is effected by carburetor suction alone, as taught by the prior art, during periods of heavy loads (knocking periods) when air velocity in the venturi is low, an insufficient quantity of the water will be withdrawn from its supply tank to obtain full benefit. In addition, a definite lag in the flow occurs when the throttle is moved from idling to open position. We propose to overcome this disadvantage by maintaining the water supply in the tank under a constant positive pressure, this pressure boosting the suction effect of the carburetor, to provide a positive, instantaneous and adequate flow, and controlling the flow automatically in response to engine requirements.

In our copending application Serial No. 560,259, filed October 25, 1944, we have disclosed pressurizing the water supply tank by means of a small auxiliary constant pressure pump operating to deliver air into the head space of the tank. This system functions with high efficiency. We have found, however, that highly satisfactory operation can be obtained by utilizing the pressure of steam generated for supplying the engine to pressurize the water supply tank.

This invention therefore has for one of its principal objects to provide a system for introducing steam to the cylinder charge of an internal combustion engine wherein a supply of water is connected through a steam generator with the air induction system of the engine and flow of the fluid is effected positively under a pressure head of steam supplied from the steam generator.

Another object of the invention is to provide a system of the above character employing a valve responsive to intake manifold pressures of the engine to control the flow of the fluid in accordance with engine requirements.

Another object of the invention is to provide such a system in which a main jet of steam is introduced into the fuel mixture when the engine is operating under heavy load and in which means are provided for introducing a secondary supply of steam to the idling mixture.

A further object of the invention is to provide such a system designed and including means to prevent damage to the system due to the formation of ice therein during freezing temperatures.

With these and other important objects and advantages in view, which will become apparent during the course of the following description, the invention consists in the parts and combinations herein after set forth with the understanding that the necessary parts comprising the combination may be varied by those skilled in the art without departing from the spirit of the invention.

In order to make the invention more clearly understood, preferred embodiments thereof have been illustrated in the accompanying drawings in which:

Figure 1 is a view in side elevation of a spark ignition engine of conventional design incorporating a system for supplying steam to the air induction system of the engine in accordance with one embodiment of the invention.

Figure 2 is a longitudinal sectional view of the flow control valve and a fragment of the water supply tank.

Figure 3 is a cross sectional view of the water supply tank taken along the line 3—3 looking in the direction of the arrows.

Figure 4:
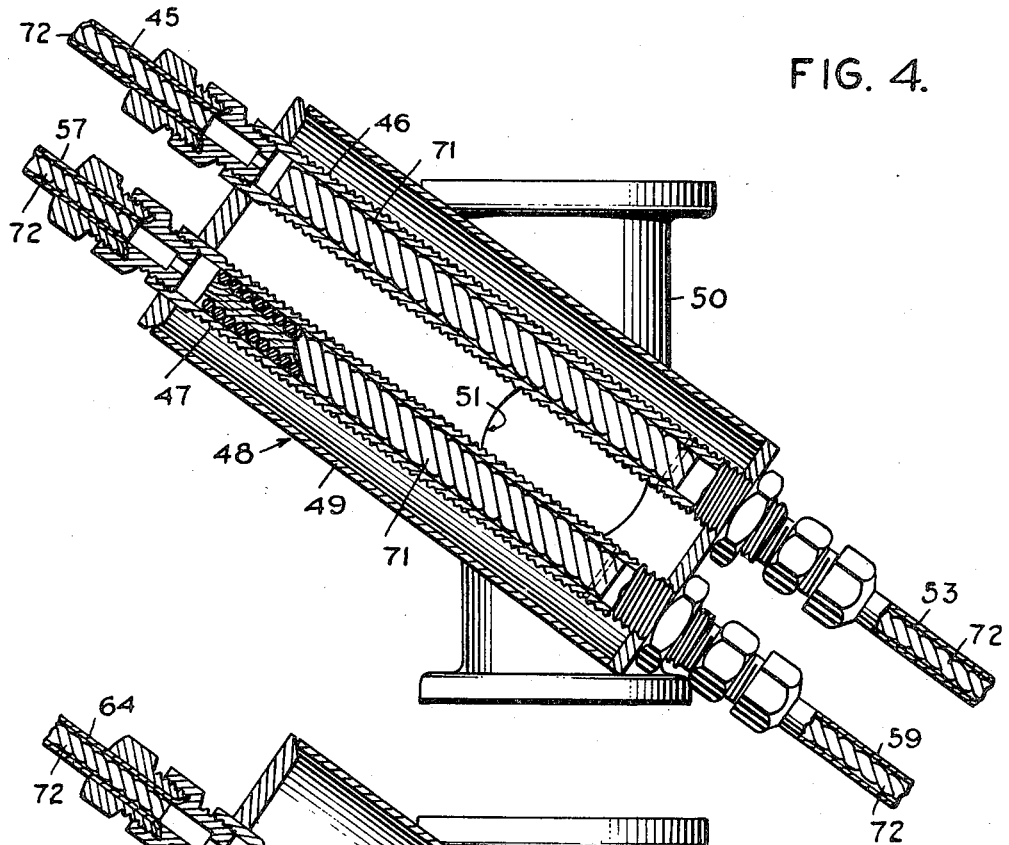
Figure 4 is a longitudinal sectional view of the steam generator incorporated in the system shown in Figure 1.
Figure 7:
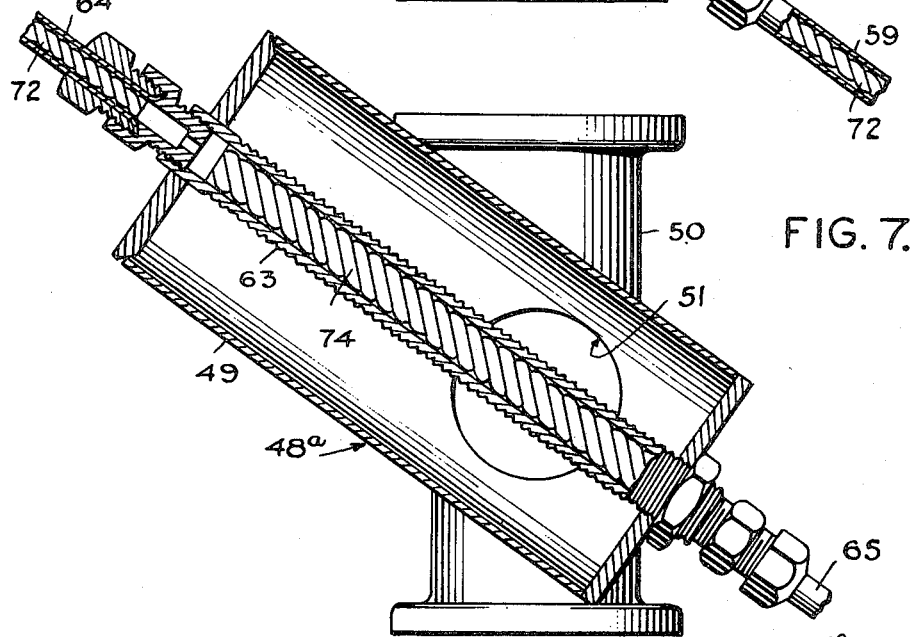
Figure 7 is a longitudinal sectional view of the type of steam generator employed in the modified embodiment of the invention.

Referring more particularly to the drawings, there is shown in Figure 1 a conventional spark ignition multi-cylinder engine 1 having the usual external exhaust system consisting of exhaust manifold 2 and exhaust pipe 3 and the usual fuel induction system consisting of intake manifold 4 for distributing fuel mixture supplied thereto by a carburetor 5. The carburetor 5 is likewise of conventional design consisting of a barrel 6 having a main Venturi section 7 and a secondary Venturi set 8. Liquid fuel is supplied to mix with air flowing through the barrel 6 from a float chamber 9 through either a main jet 10, discharging into the secondary Venturi set 8, or through an idling jet 11 discharging into the barrel adjacent the throttle valve 12, depending on whether the throttle valve is opened or closed.

To supply steam to the fuel mixture in accordance with this invention, to suppress detonation and to gain other advantages through the introduction of moisture to the cylinders of the engine, a tank 13, adapted to hold a supply of water, is positioned adjacent the engine, to be warmed thereby, preferably as close as practical to the exhaust manifold 2. As shown in Figure 1, the tank is mounted above the intake manifold 4 and secured in place by means of depending straps 14 secured to the opposite end of the tank and having their free ends attached to the intake manifold studs.

The tank 13 is entirely enclosed and is preferably constructed in the form of an inverted rectangular frusto-pyramid with both its side wall and end walls inclined outwardly from the vertical so that the interior of the tank flares outwardly from the bottom wall 15 thereof to the top wall 16.

Passing downwardly through the top wall 16 of the tank is a filling tube 17 fitted with a pressure tight cap 18. The tube 17 passes a short distance downwardly into the tank so that when the tank is filled, air pressure in the space between the lower end of the filling tube 17 and the top wall of the tank will prevent its being completely filled and provide a head space 19 in the tank, such as shown in Figure 3. With the tank so constructed, it will be seen that should the water therein freeze, expansion due to ice formation will be directed upwardly into the expanded section of the tank and the force of lateral expansion on the side and end walls will be relieved.

Mounted on the top of the tank 13, as best seen in Figure 2, is a diaphragm valve indicated generally as 20, and comprising a split casing 21 divided into an upper chamber 22 and a lower chamber 23 by means of a flexible diaphragm 24 secured between the two halves of the casing. Passing through a central aperture in the lower wall of the casing 21 and a registering aperture in the top wall 13 of the water tank, and threaded into a block 25 secured to the under surface of the upper tank wall 16, is a tubular fitting 26. If desired a sealing gasket 27 may be positioned between the valve and upper surface of the tank. This fitting is provided with an axial bore 28 forming at its upper end a conical valve seat 29 and a valve inlet port 30 which discharges into the flow passage 23. Slidably mounted in the bore 28 is a conical valve element 31 provided with an axial extension or stem member 32 which extends through the port 30 to adjacent the diaphragm 24. Urging the valve element to its closed position is a light compression spring 33 positioned between the valve element and a spring seat screw threaded into the bore 28 and provided with a flow control orifice 35. Connected with the lower end of the fitting 26 is a tube 36 which extends substantially to the bottom of the tank 13. The lower end of this tube may be cut at an angle to prevent blocking its passage by contact with the bottom wall of the tank, and, if desired, may be provided with a screen 37.

The central portion of the diaphragm 24 is confined between the usual top and bottom flexure restricting plates 38 and 39 and has secured thereto a guiding stem 40 which extends upwardly into a screw threaded guide member 41 threaded through the upper wall of the casing 21 and provided with a lock nut 42. The lower end of the screw member 41 is recessed to provide a seat for one end of a compression spring 43, the opposite end of which bears against the upper diaphragm plate 38. This spring has a compression force exceeding that of the spring 33 with the effect that normally it forces the diaphragm downwardly so that it will engage the valve stem 31 to move the valve element 30 off of its seat to open the port 21.

The valve is designed to operate automatically in response to predetermined intake manifold pressures and to this end the upper, or diaphragm, chamber 22 is in communication with the intake manifold 4 through a pipe line 44. The compression force of the spring 43 is selected or may be adjusted by manipulation of the screw threaded guide member 41, so that when manifold pressures are high—as will be the case when the engine is not running or is running under substantial load with open throttle and low R. P. M.—the suction on the diaphragm will not be sufficient to overcome the force of the spring 43 and the valve will be open. On the other hand, when the engine is idling with closed throttle or running under low loads, the manifold pressure will be low and create sufficient suction on the diaphragm 24 to overcome the force of the spring 43 and flex the diaphragm upwardly away from the valve stem 31 and permit the spring 32 to close the valve. The compression force of the spring 43, and as a consequence the force necessary to compress the spring, may be easily regulated by moving the screw 41 toward or away from the diaphragm.

Communicating with the lower chamber 23 of the valve 20 is one end of discharge pipe 45, the opposite end of which connects with one end of one of a pair of tubes numbered respectively 46 and 47 which form liquid tubes of a steam generator designated generally as 48.

Figure 5:
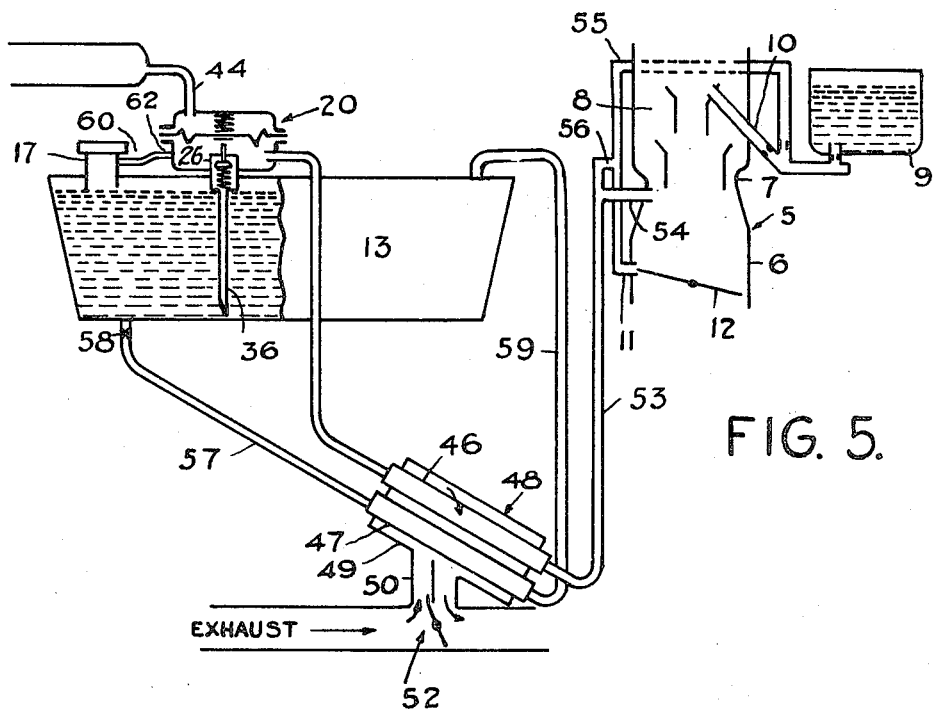
Figure 5 is a diagrammatic view of the system shown in Figure 1.

The steam generator 48 is best shown in Figure 4 and comprises an elongated enclosed shell 49 through which the tubes 46 and 47 pass. The shell 49 constitutes the heating chamber of the steam generator and is supplied with heat of exhaust gases from the engine through a coupling member 50 communicating with the chamber 49 through connecting passage 51. The coupling member 50 is connected in the exhaust system conveniently between the exhaust manifold 2 and the exhaust pipe 3 as shown in Figure 1 so that a portion of the exhaust gases flowing from the engine will enter the shell 49, flow about the tubes 46 and 47 and transmit heat to these tubes as indicated in Figure 5. If desired, the flow of exhaust gases to the shell 49 may be controlled by a suitable deflecting flap or valve such as diagrammatically illustrated at 52. The steam generator is preferably designed with the tubes 46 and 47 inclined at an angle to the horizontal, their input ends being at the higher elevation so that liquid flowing through the tubes will contact the tube wall in a relatively thin stream to effect rapid vaporization.

The lower or outlet end of the tube 46 has connected thereto one end of a discharge pipe or steam line 53 which leads to and connects with the carburetor barrel 6, through a fitting 54, adjacent the restriction of the main venturi 7. The steam line 53 is also connected with the idling system of the carburetor shown diagrammatically at 55 in Figure 5 by means of a small connecting tube 56 interposed between the fitting 54 and the fuel flow passage of the idling system 55.

In order to pressurize the tank 13 in accordance with this invention, the lower portion of the tank has communicating therewith one end of a conduit 57 restricted by a small metering orifice 58. The opposite end of the conduit 57 connects to the upper or inlet end of the tube 47 of the steam generator while a second conduit 59 connects the lower end of the tube 47 with the head space 19 of the tank 13. By means of this structure, it can be seen that a small amount of water will flow by gravity from the tank into the tube 47 of the steam generator and, when the engine is operating and exhaust gases are heating the tube, steam will pass through the line 59 into the head space 19 and create a superatmospheric pressure in the tank.

The operation of the system is as follows:

When the engine is operating under high loads, normally causing knocking, that is, when the R. P. M. is low and the throttle valve 12 is open, the suction in the intake manifold, reacting on the diaphragm 24, will be low and the spring 43 will force the valve element 31 off its seat. During such conditions, the steam pressure in the head space of the tank 13 will force water from the tank upwardly through the tube 36, past the open valve, into the chamber 23 and thence through the line 45 into the tube 46 of the steam generator where it boils upon contact with the heated tube. This steam is drawn by the suction effect of the venturi 7, boosted by the pressure head in the tank 13, through the line 53 and the fitting 54 into the carburetor barrel 6. At the same time, of course, liquid fuel is being drawn from the float chamber 9 also into the carburetor barrel where it enters the air stream flowing through the carburetor barrel and intimately mixes with the air stream and steam. The amount of steam entering the carburetor is small in comparison with the volume of air, but the heat is sufficient, however, to assist in completely vaporizing the liquid fuel. After the mixture of air, fuel and steam is thus formed, it is drawn through the intake manifold 3 and distributed thereby to the various cylinders of the engine.

When the speed of the engine picks up beyond the knocking range, its increased R. P. M. increases the vacuum in the intake manifold. This increase in vacuum moves the diaphragm away from the stem 32 of the valve element 31, permitting the light spring 33 to close the valve and shut off the flow of water to the steam generator tube 46. Under such conditions, and also during idling conditions of the engine when vacuum in the intake manifold is also sufficiently high to close the valve, it is desirable that a small amount of steam be admitted to the fuel charge. To provide for such situations, the head space of the tank 13 is connected with the flow passage 23 of the valve through a tube 60, one end of which may, for convenience, be connected with the filler tube 17. The opposite end of the tube 60 is connected to a fitting 61 provided with a small orifice 62 and threaded through the wall portion of the casing 21. Thus it will be seen that when the valve 31 is closed, steam from the head space 19 will flow, partly under the pressure in the head space and partly by suction effect at the venturi 7, or at the idling jet 11, depending on whether the valve 12 is open or closed, to introduce steam into the carburetor.

The orifice 62 is calibrated with respect to the diameter of the steam line 59 so that during operation, when steam is being generated in the tube 47 and supplied to the head space of the tank, a substantial differential of pressure exists between the head space and the lower chamber 23 of the valve. On the other hand, when the engine is stopped and the generation of steam in the tube drops off, the orifice serves to rapidly equalize pressures in the tank and chamber 23 and prevent syphoning of water from the tank through the open valve.

Figure 6:
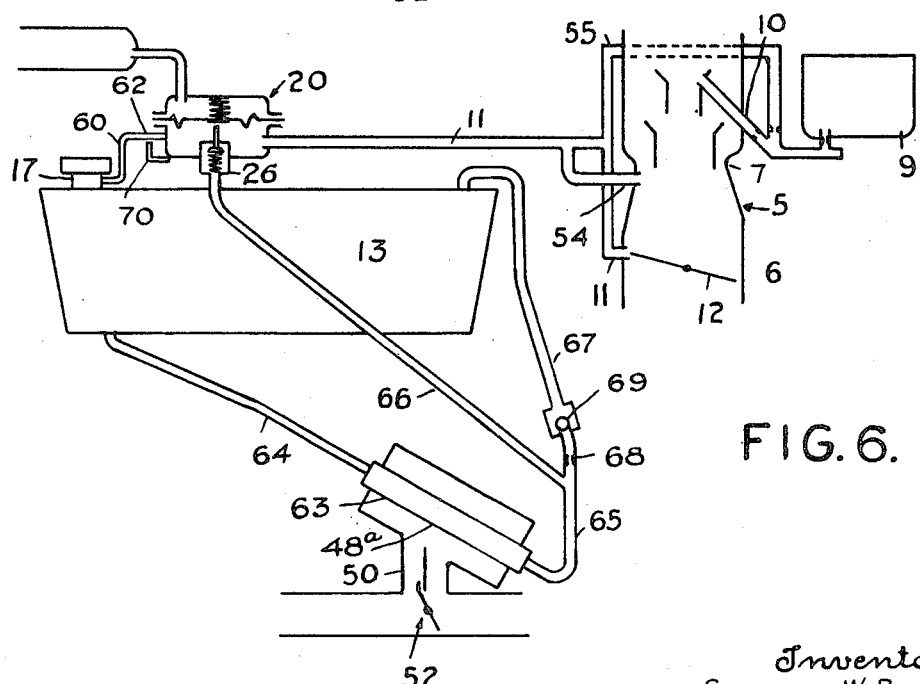
Figure 6 is a diagrammatic view of a modified system.

In the modified form of the apparatus which is shown diagrammatically in Figure 6, the steam generator 48a employs only a single steam generating tube 63 which supplies steam both to the engine cylinders and to pressurize the tank 13. Otherwise the steam generator 48a is similar in construction to the generator 48 and the corresponding parts bear the same reference numerals. In this case the input or upper end of the tube 63 is connected with the lower portion of the tank by means of a connecting line 64 while the lower end of the tube has connected thereto one end of a line 65 which is branched, one branch 66 being connected to the lower end of the fitting 26 at the input side of the valve 20 and the other branch 67 communicating with the head space of the tank 13 through the top wall thereof. Preferably the branch line 67 is provided with a restricting orifice 68, to control the flow of steam therethrough, and a check valve 69 to prevent back flow through the line. The valve 20, since it does not communicate directly with the tank, may be secured in any suitable position and by any suitable means such as indicated by the bracket 70 in Figure 6.

In this embodiment, the valve 20, instead of controlling the flow of water from the tank to the steam generator, controls the main flow of steam to the carburetor. The valve, however, operates in the same manner as that described above, to open when the engine is operating under load and to close during other operating conditions. Thus when the engine is started and the exhaust gases flow through the heating chamber 49 of the steam generator 48a, water, flowing through the line 64 to the tube 63 will be transformed into steam which discharges through the lines 65 and 67 into the head space of the tank 13 pressurizing the tank and providing a small flow through the line 60 into the lower chamber 23 of the valve and thence through a line 71 connecting the chamber 23 with the steam jet 54 and the idling system 55 of the carburetor.

When the engine is under load so that the valve 20 opens, steam generated in the tube 63 will flow through the unrestricted line 66, through the open valve, line 71 and steam jet 54 to intimately mix with the fuel mixture being formed in the carburetor. In this case, as in the case of the preferred embodiment, the steam pressure in the head space of the tank assures a positive supply of steam to the carburetor instantly when required.

As set forth above, the shape of the tank 13 will prevent damage thereto in case of freezing. To also protect the liquid carrying lines in freezing temperatures, these lines may be provided with compressible inserts which will yield inwardly to compensate for expansion in the lines due to ice formation. Such inserts are indicated as 71 in the steam generator tubes and connecting lines. The inserts may be made of any suitable compressible material such as sponge rubber or, as illustrated in the drawings, wire rope having a compressible core such as hemp.

From the foregoing it will be seen that this invention provides a simple and economical means for maintaining a steam supply system under constant pressure to boost or assist the flow of steam to the carburetor so that a supply of the steam is always instantly jetted into the carburetor regardless of changes in operating conditions.

While only preferred embodiments of the invention are shown and described, it will be appreciated that variations in the arrangement and construction of the component parts will be obvious to those skilled in the art and may be made without departing from the spirit of the invention or exceeding the scope of the appended claims.

We claim:

1. In an internal combustion engine having a fuel mixture induction system, an enclosed container, the lower portion thereof defining a water reservoir and the upper portion defining a head space, a pair of steam generating tubes, a first conduit including one of said tubes and connecting the water reservoir with said induction system for supplying steam thereto, a second conduit including the other of said tubes and connecting the water of said reservoir with said head space for supplying steam thereto to establish a differential of pressure between the head space and the induction system for effecting flow through the first conduit, and means for heating said tubes.

2. In an internal combustion engine having an internal combustion system and an exhaust system, an enclosed container, the lower portion thereof defining a water reservoir and the upper portion defining a head space, a steam generator having a heating chamber communicating with said exhaust system to be supplied with heated gases therefrom, steam generating tubes extending through said chamber, a first conduit including certain of said tubes and connecting the water reservoir with said induction system for supplying steam thereto, a second conduit including the other of said tubes connecting the water reservoir with said head space for supplying steam to the head space to establish a differential of pressure therebetween, and an induction system for effecting flow through the first named conduit.

3. In an internal combustion engine having a fuel mixture induction system including an intake manifold, and an exhaust system, an enclosed container, the lower portion thereof defining a water reservoir and the upper portion defining a head space, a steam generator having a heating chamber communicating with the exhaust system to be supplied with heated exhaust gases therefrom, steam generating tubes extending through the chamber, a conduit including certain of said tubes connecting the water reservoir with said induction system for supplying steam thereto, a second conduit including the other of said tubes and connecting the water reservoir with said head space for establishing a pressure head of steam in the head space to effect a flow through the first conduit, and valve means responsive to changes in pressure in said manifold associated with the first conduit for controlling flow therethrough in accordance with manifold pressure.

4. In an internal combustion engine having a fuel mixture induction system including an intake manifold, and an exhaust system, an enclosed container, the lower portion thereof defining a water reservoir and the upper portion defining a head space, a steam generator having a heating chamber communicating with the exhaust system to be supplied with heated exhaust gases therefrom, steam generating tubes extending through the chamber, a conduit including certain of said tubes connecting the water reservoir with said induction system for supplying steam thereto, a second conduit including the other of said tubes and connecting the water reservoir with said head space for establishing a pressure head of steam in the head space to effect a flow through the first conduit, and valve means responsive to changes in pressure in said manifold interposed in the first named conduit between the water reservoir and the steam generator for controlling the generation and introduction of steam to said induction system according to manifold pressure.

5. In an internal combustion engine having a fuel mixture induction system including an intake manifold, and an exhaust system, an enclosed container, the lower portion thereof defining a water reservoir and the upper portion defining a head space, a steam generator having a heating chamber communicating with the exhaust system to be supplied with heated exhaust gases therefrom, steam generating tubes extending through the chamber, a conduit including certain of said tubes connecting the water reservoir with said induction system for supplying heat thereto, a second conduit including the other of said tubes and connecting the water reservoir with said head space for establishing a pressure head of steam in the head space to effect a flow through the first conduit, and valve means interposed in the first conduit between said water reservoir and steam generator, said valve means being responsive to changes in pressure in said manifold to open when said pressure is high and close when said pressure is low, and orifice means connecting the head space of the container with the first conduit and by-passing the valve for introducing a limited quantity of steam from the head space to the induction system when the valve is closed.

6. In an internal combustion engine having a fuel mixture induction system, an enclosed container, the lower portion thereof defining a water reservoir and the upper portion defining a head space, a pair of steam generating tubes, a first conduit including one of said tubes and connecting the water reservoir with said induction system for supplying steam thereto, a second conduit including the other of said tubes and connecting the water of said reservoir with said head space for supplying steam thereto to establish a differential of pressure between the head space and the induction system for effecting flow through the first conduit, orifice means in the second conduit for restricting flow therethrough, and means for heating said tubes.

7. In an internal combustion engine having a fuel mixture induction system, an enclosed container, the lower portion thereof defining a water reservoir and the upper portion defining a head space, a pair of steam generating tubes, a first conduit including one of said tubes and connecting the water reservoir with said induction system for supplying steam thereto, a second conduit including the other of said tubes and connecting the water of said reservoir with said head space for supplying steam thereto to establish a differential of pressure between the head space and the induction system for effecting flow through the first conduit, orifice means in the second conduit between the water reservoir and steam generating tube associated with the second conduit for metering the flow of water to the said tube, and means for heating both of said tubes.

8. In an internal combustion engine having a fuel induction system including an intake manifold and a carburetor and an exhaust system, an enclosed container, the lower portion thereof defining a water reservoir and the upper portion defining a head space, a steam generator having a heating chamber communicating with the exhaust system to be supplied with heated gases therefrom, a pair of steam generating tubes extending through the chamber, a conduit including one of said tubes and having one of its ends communicating with the water reservoir, and the other end communicating with the mixing chamber of the carburetor for supplying steam thereto, a second conduit including the other of said tubes and having its opposite ends communicating respectively with the water reservoir and head space of said container for establishing a pressure head of steam in the head space to effect a flow in the first conduit, orifice means in the second conduit adjacent the water reservoir for metering water therefrom to the tube associated with the said second conduit, valve means associated with the first conduit and responsive to intake manifold pressure to open when the engine is operating under load, a branch conduit connecting the first conduit with the idling system of the carburetor, and orifice means connecting the first conduit with the head space of the container and by-passing the valve for supplying steam to the idling system when the valve is closed.

9. In an internal combustion engine having a fuel mixture induction system, an enclosed container, the lower portion thereof defining a water reservoir and the upper portion defining a head space, a steam generating tube, means for heating the tube, a liquid line connecting the water reservoir with said tube for supplying water thereto, a steam line connecting the tube with said induction system for supplying steam thereto, and a branch conduit connecting the steam line with said head space for introducing steam to the head space to establish a differential of pressure between the same and said induction system to effect a flow from the container to the induction system.

10. In an internal combustion engine having a fuel mixture induction system, an enclosed container, the lower portion thereof defining a water reservoir and the upper portion defining a head space, a steam generating tube, means for heating the tube, a liquid line connecting the water reservoir with said tube for supplying water thereto, a steam line connecting the tube with said induction system for supplying steam thereto, a branch conduit connecting the steam line with said head space for introducing steam to the head space to establish a differential of pressure between the same and said induction system to effect a flow from the container to the induction system, and orifice means in said branch conduit for metering the steam introduced to said head space.

11. In an internal combustion engine having a fuel mixture induction system, an enclosed container, the lower portion thereof defining a water reservoir and the upper portion defining a head space, a steam generating tube, means for heating the tube, a liquid line connecting the water reservoir with said tube for supplying water thereto, a steam line connecting the tube with said induction system for supplying steam thereto, a branch conduit connecting the steam line with said head space for introducing steam to the head space to establish a differential of pressure between the same and said induction system to effect a flow from the container to the induction system, and one-way valve means associated with said branch conduit for controlling the flow of steam therethrough.

12. In an internal combustion engine having a fuel mixture induction system including an intake manifold, an enclosed container, the lower portion thereof defining a water reservoir and the upper portion defining a head space, a steam generator, a liquid line connecting the water reservoir with the steam generator for supplying water thereto, a steam line connecting the steam generator with the induction system for supplying steam thereto, a branch conduit connecting the steam line with the head space for introducing steam to said head space to establish a differential of pressure between the same and the induction system for effecting a flow from the container to the induction system, and valve means responsive to changes in intake manifold pressure associated with the steam line for controlling said flow in accordance with manifold pressure.

13. In an internal combustion engine having a fuel mixture induction system and an exhaust system, an enclosed container, the lower portion thereof defining a water reservoir and the upper portion defining a head space, a steam generator having a heating chamber communicating with said exhaust system to be supplied with heated gases therefrom, a steam generating tube extending through said chamber, a liquid line connecting the water reservoir with one end of said tube for supplying water to the tube, a steam line connecting the opposite end of said tube with the induction system for supplying steam to said system, a branch conduit connecting the steam line with said head space for introducing steam to the head space to establish a differential of pressure between the same to effect a flow from the container to the induction system.

14. In an internal combustion engine having a fuel mixture induction system including an intake manifold, an enclosed container, the lower portion thereof defining a water reservoir and the upper portion defining a head space, a steam generator, a liquid line connecting the water reservoir with the steam generator for supplying water thereto, a steam line connecting the steam generator with the induction system for supplying steam to the induction system, a branch conduit connecting the steam line with said head space for introducing steam thereto to establish a differential of pressure between the head space and the induction system to effect a flow from the container to the induction system, a valve associated with the steam line, an actuator for the valve responsive to changes in intake manifold pressure of the engine to open the valve when said manifold pressure is high and close the valve when the manifold pressure is low, and orifice means connecting said head space with the steam line and by-passing the valve for supplying a limited quantity of steam from said head space to the induction system when the valve is closed.

SOUTHWICK W. BRIGGS.
ROSCOE C. PORTER.

REFERENCES CITED

The following references are of record in the file of this patent:

UNITED STATES PATENTS

| Number | Name | Date |
|---|---|---|
| 1,542,999 | Frazier | June 23, 1925 |
| 1,889,584 | Zimmerer | Nov. 29, 1932 |
| 2,052,327 | Waters et al. | Aug. 25, 1936 |